(12) United States Patent
James

(10) Patent No.: US 6,618,895 B1
(45) Date of Patent: Sep. 16, 2003

(54) WATER-DIVERTING WINDSHIELD WIPER BLADES

(76) Inventor: Albert J. James, 1109 Heather Island La., Seabrook Island, SC (US) 29455

( * ) Notice: Subject to any disclaimer, the term of this patent is extended or adjusted under 35 U.S.C. 154(b) by 87 days.

(21) Appl. No.: 09/714,880

(22) Filed: Nov. 16, 2000

Related U.S. Application Data

(63) Continuation-in-part of application No. 09/631,071, filed on Aug. 2, 2000, now abandoned.

(51) Int. Cl.$^7$ .................................................. B60S 1/38
(52) U.S. Cl. .................................. 15/250.41; 15/250.48
(58) Field of Search .......................... 15/250.41, 250.48, 15/250.04, 250.4, 250.02, 250.01, 250.05, 250.07, 250.361, 250.09

(56) References Cited

U.S. PATENT DOCUMENTS

| | | | |
|---|---|---|---|
| 1,370,910 A | | 3/1921 | Pederson |
| 1,441,593 A | | 1/1923 | Lavietes |
| 1,678,688 A | | 7/1928 | Zaiger ..................... 15/250.41 |
| 1,725,405 A | * | 8/1929 | McConnell ................ 15/250.3 |
| 2,908,028 A | * | 10/1959 | Runton et al. ........... 15/250.48 |
| 3,916,473 A | | 11/1975 | Williams ................. 15/250.04 |
| 4,164,802 A | | 8/1979 | Rouse ..................... 15/250.03 |
| 4,339,839 A | | 7/1982 | Knights .................... 15/250.04 |
| 4,567,621 A | | 2/1986 | Alley, Jr. ................. 15/250.41 |
| 4,616,060 A | | 10/1986 | Killgoar, Jr. .............. 524/574 |
| 4,723,336 A | | 2/1988 | Nakayama ............... 15/250.41 |
| 4,745,653 A | | 5/1988 | Bliznak ................... 15/250.04 |
| 5,168,595 A | | 12/1992 | Naylor, Jr. ................. 15/250.4 |

FOREIGN PATENT DOCUMENTS

| | | | | |
|---|---|---|---|---|
| DE | 3644693 | 6/1988 | | |
| FR | 854122 | 4/1940 | | |
| FR | 2373426 | 7/1978 | | |
| FR | 2420460 | 11/1979 | | |
| GB | 1316781 | * 5/1973 | .............. | 15/250.41 |
| JP | 63-258243 | 10/1988 | | |
| JP | 404078642 | 3/1992 | | |
| JP | 179349 | * 6/1994 | .............. | 15/250.48 |

* cited by examiner

Primary Examiner—Gary K. Graham
(74) Attorney, Agent, or Firm—Libert & Associates; Victor E. Libert; Frederick A. Spaeth

(57) ABSTRACT

A wiper allows controlled passage of water through at least one blade of the wiper. In one embodiment, the wiper comprises first and second substantially parallel wiper blades (26, 28), each having wiping faces (26c, 28c) in contact with a surface S and defining therebetween a channel (30). The blades (26, 28) have formations thereon, such as notches (34,36) dimensioned and configured to permit passage of water through first blade (26) to the channel (30) when the first blade (26) is moving in a first direction and to prevent passage of water through notches (34) when the first blade is moving in a second direction opposite to the first direction. The second blade (28) formations, e.g., notches (34) permit water to pass through the formations when the second blade (28) is moving in the second direction and to prevent passage of water therethrough when the second blade is moving in the first direction. Water trapped within channel (30) will then be diverted out the ends of the channel. The first and second blade may be angled and thus form a wedge-shaped channel to further the removal of water therefrom. At least one intermediate blade (27) may be disposed between the first and second blades (726, 728) to divide the channel (730) into a first course (30a) and a second course (30b). Improved conventional blades are provided with notches on the water-diverting edges or on the secondary blades thereon.

12 Claims, 9 Drawing Sheets

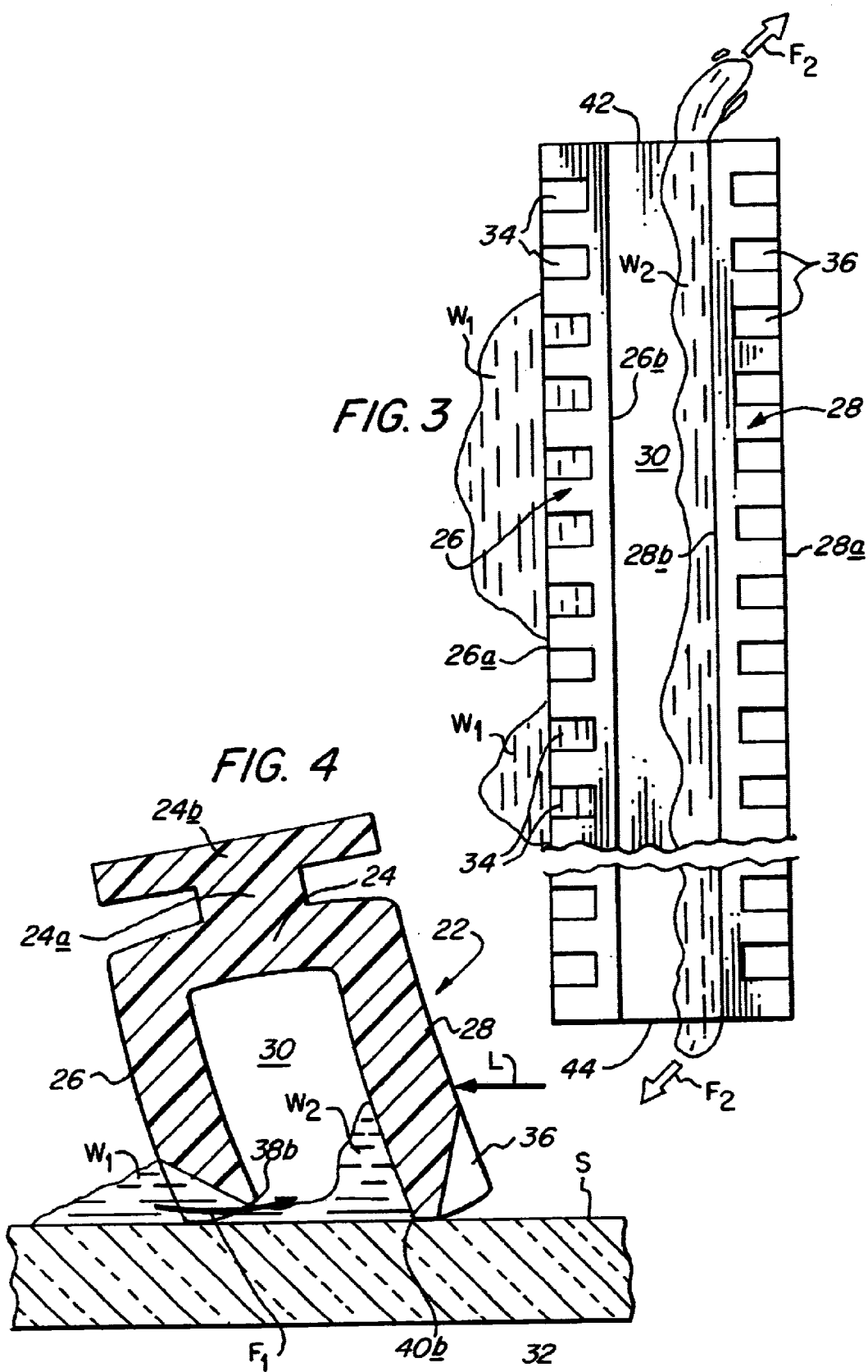

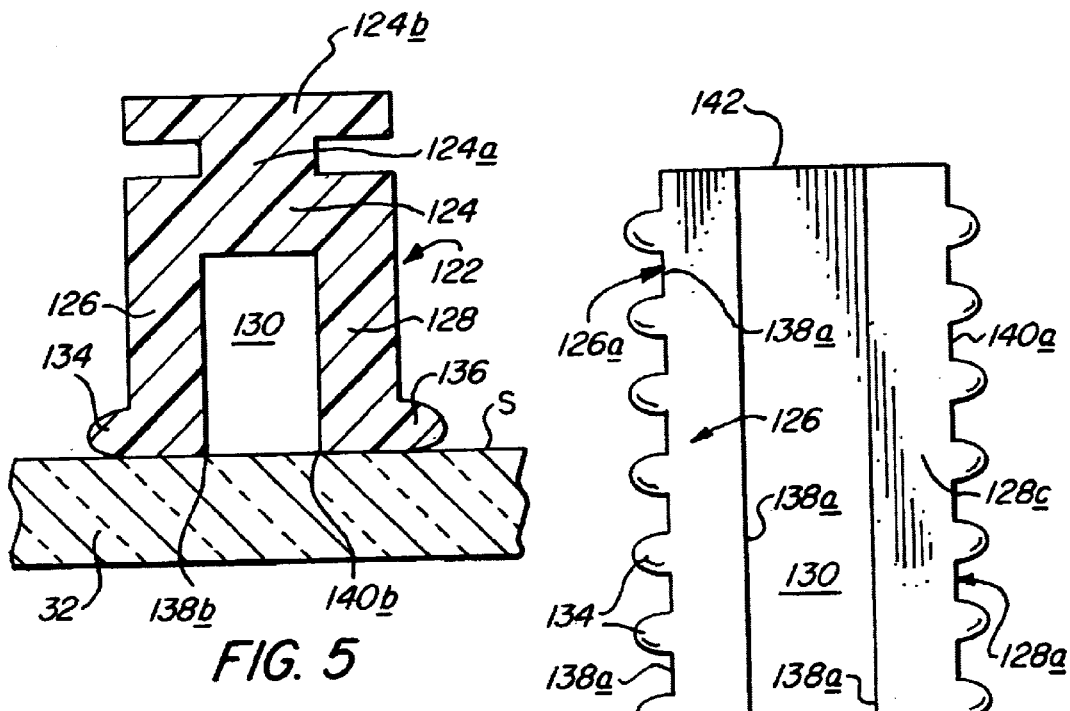
FIG. 5
FIG. 6
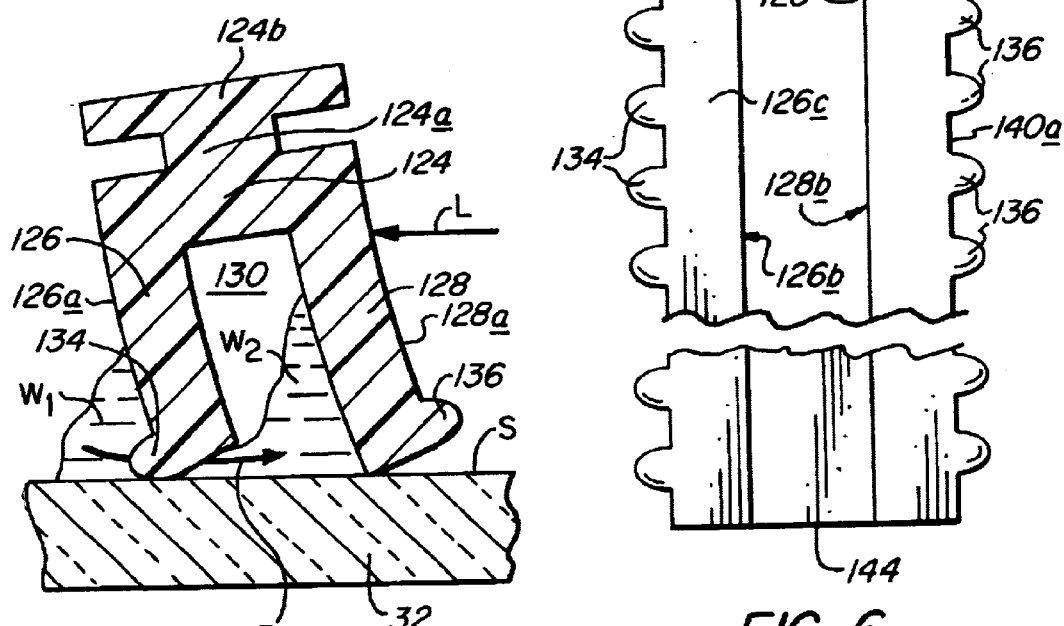
FIG. 7

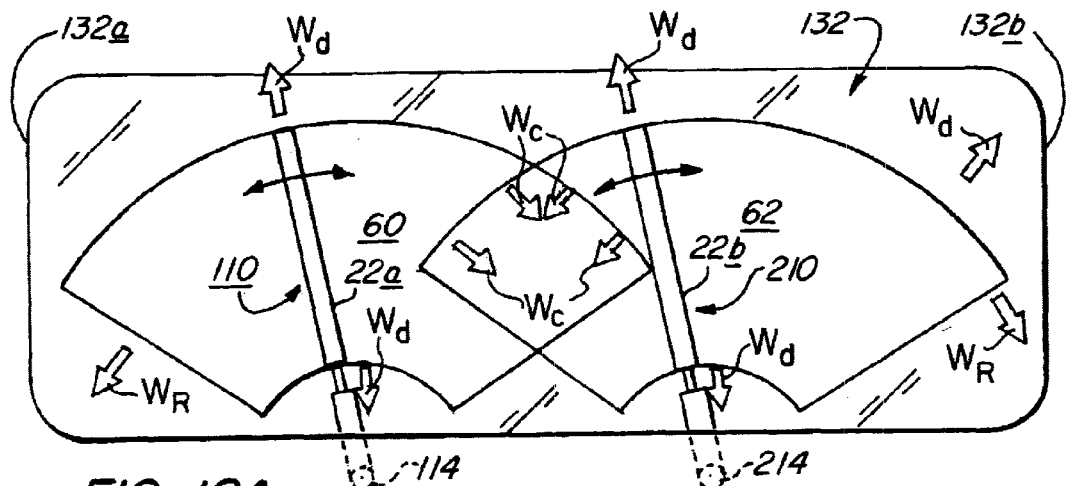
FIG. 12A
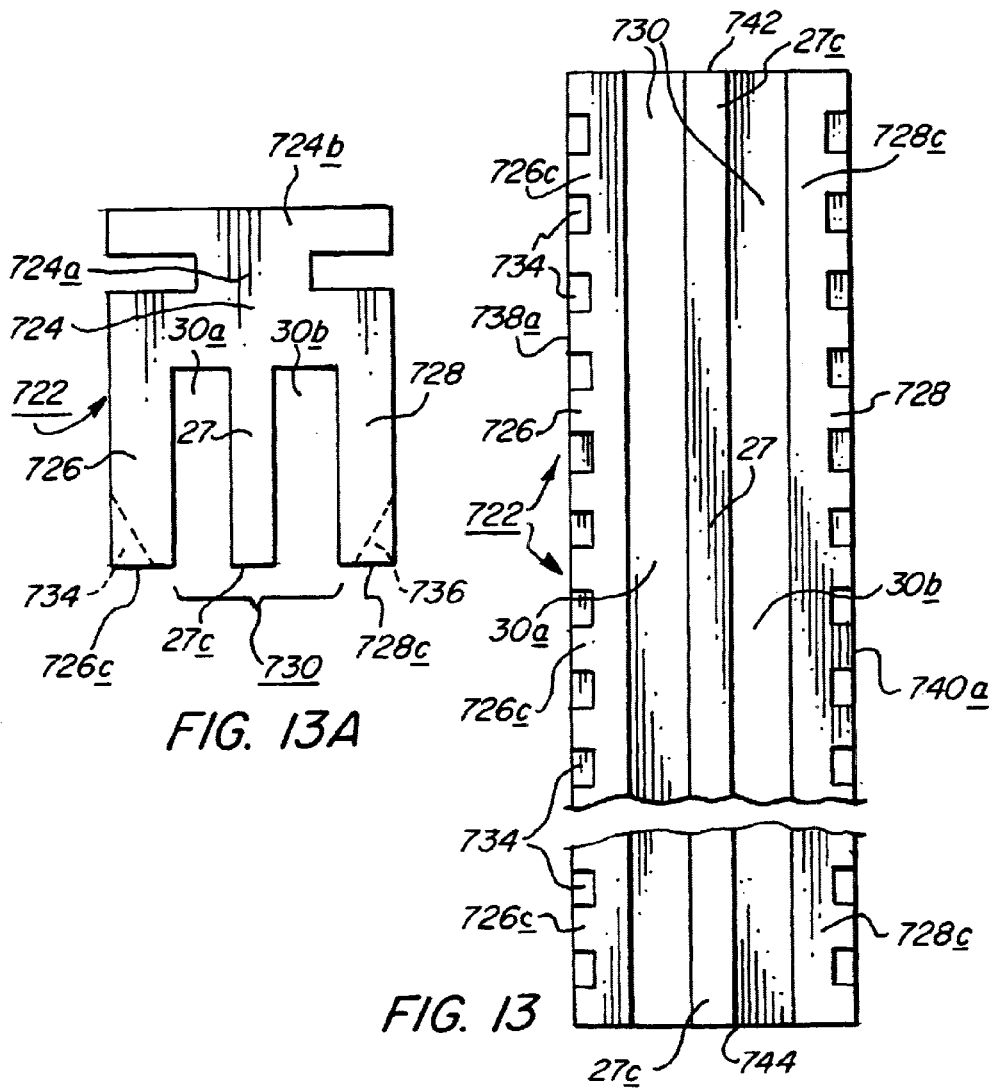
FIG. 13A
FIG. 13

WATER-DIVERTING WINDSHIELD WIPER BLADES

CROSS-REFERENCE TO RELATED APPLICATION

This application is a continuation-in-part of application Ser. No. 09/631,071, filed Aug. 2, 2000 now abandoned.

BACKGROUND OF THE INVENTION

1. Field of the Invention

This invention relates generally to reciprocating wipers, e.g., windshield wipers, and, specifically, to windshield wipers having one or more blades which have formations therein which permit flow of liquid, e.g., water, through the blades in one direction of movement of the wiper, but not in the other.

2. Related Art

Known wipers usually comprise one or more resilient rubber blades mounted on an arm which reciprocatingly sweeps the blades sideways across the surface of a window, vehicle windshield, headlight lens or other formation. As the blades move across the surface, they push water or other liquids on the surface sideways until the arm reaches the limit of its travel, discharging an accumulation of water at the point where the arm stops and reverses its motion. The result is a fan-shaped cleared arc on the surface which is swept clear of water, at least temporarily. In a typical windshield arrangement, an adjacent wiper assembly pushes some or all of the water it has cleared into the cleared arc of the adjacent wiper assembly. The accumulated water reduces visibility through a windshield or the like and presents a driving hazard. Removal of the water from the windshield is accomplished only when the accumulated water runs off the bottom and sides of the windshield or, in moving vehicles, is pushed off the upper edge of the windshield by aerodynamic pressure.

It is well known in the art to provide two or more parallel wiper blades on a single wiper arm to increase the efficiency of the wiping action, as shown by the following patents.

U.S. Pat. No. 5,168,595, issued to James L. Naylor, Jr. on Dec. 8, 1992 and entitled "Windshield Wiper Blade and Assembly", discloses one such system. A single wiper arm assembly 20 (shown in FIGS. 1 through 7) has an elongated blade carrier assembly 36 pivotally mounted to the arm 24, and first and second blades 26 and 27 mounted on the blade assembly 36.

U.S. Pat. No. 4,745,653, issued to Bedrich V. Bliznak on May 24, 1988 and entitled "Wiper/Scraper/Washer Blade for Windows on Transportation Means", discloses a multiple edged blade 1 (shown in FIG. 1) having two blades of different cross sections in contact with the surface to be cleaned, the smooth blades having a serrated appearance in cross-sectional view.

U.S. Pat. No. 4,567,621, issued to Robert L. Alley, Jr. on Feb. 4, 1986 and entitled "Composite Windshield Wiper Assembly", discloses a wiper blade assembly A (shown in FIG. 1) having a pair of spaced wiper blade elements 42, 44 having thin resilient wiping edges 42a, 44a. A scrubbing block 50 occupies the entire space between the wiping blade elements and protrudes at 52 past the wiping edges 42a, 44a.

U.S. Pat. No. 4,339,839, issued to Robert E. Knights on Jul. 20, 1982 and entitled "Windscreen Wipers", discloses (see FIG. 1) a windscreen wiper having a pair of spaced parallel wiping lips 22 bounding a space 28 in which is a bristle 32.

U.S. Pat. No. 3,916,473, issued to Zelmer L. Williams on Nov. 4, 1975 and entitled "Wiper for Windshields", discloses (see FIG. 6) a single longitudinal blade 38 provided with a longitudinal groove 40 running substantially the length of the blade 38. An aperture 42 in the blade base 36 permits feed of a fluid, such as windshield washer fluid to the groove 40, from whence it flows to the windshield via passages 72 which run from the base of the blade 36 to the windshield.

U.S. Pat. No. 1,441,593, issued to Harry L. Lavietes on Jan. 9, 1923 and entitled "Windshield Cleaner", discloses a windshield wiper (see FIG. 1) having multiple strips 16 held in a pair of longitudinal grooves 15.

U.S. Pat. No. 1,370,910, issued to Julius Pederson on Mar. 8, 1921 and entitled "Windshield Cleaner", discloses in FIG. 1a windshield cleaner having wiper strips 11 held in channels 16 of wiper bar 10.

SUMMARY OF THE INVENTION

The present invention provides a wiper for wiping liquid from a surface. The wiper comprises a first blade having therein a plurality of formations disposed along at least a portion of the length thereof. The formations are configured: (a) to permit the passage of liquid through the first blade when the first blade moves across such surface in a first direction, and (b) to inhibit passage of liquid through the first blade when the first blade moves across such surface in a second direction opposite to the first direction.

In one aspect of the invention, the first blade is flexible and the formations therein are opened to permit the passage of water therethrough by flexing of the first blade during its movement in the first direction and are closed to inhibit the passage of water therethrough by flexing of the first blade during its movement in the second direction.

In another aspect of the present invention, the first blade has first and second opposite sides joined by a wiping face, the first side and the wiping face intersecting to define a first edge, and the second side and the wiping face intersecting to define a second edge.

In one aspect of the invention the wiper has a low friction material disposed on the first side of the blade at the first edge thereof whereby the coefficient of friction of the first side of the blade is lower than that of the second side of the blade. In other aspects of the invention, the formations comprise notches in, and/or protrusions on, the first edge, and/or slits extending through the first blade to define flap members between adjacent slits.

In the latter aspect of the invention, the slits may converge towards each other to provide a plurality of wedge-shaped flap members.

Yet another aspect of the present invention provides for the wiper to further comprise a second blade disposed substantially parallel to the first blade, the first and second blades defining a channel therebetween. In this aspect of the present invention, the second blade may have therein a plurality of formations disposed along at least a portion of the length thereof, which formations are configured (a) to permit the passage of liquid into the channel through the second blade when the second blade moves across such surface in the second direction and (b) to prevent the passage of liquid through the second blade when the second blade moves across the surface in the first direction. In this aspect of the present invention, the second blade may be flexible and the formations therein are dimensioned and configured to be opened by flexing of the second blade during its movement in the second direction and closed by flexing of the second blade during movement of the second blade in the first direction.

Other aspects of the invention provide for a wiper which further comprises at least one intermediate blade disposed between the first and second blades. For example, the wiper may comprise one intermediate blade which divides the channel longitudinally into first and second courses. In this aspect of the present invention, the intermediate blade may be dimensioned and configured to prevent the passage of liquid therethrough, whereby liquid which passes through he first blade is constrained to flow along the first course and liquid which passes through the second blade is constrained to flow along the second course.

In a particular embodiment of the present invention, the wiper is comprised of a first lade and a second blade disposed substantially parallel to each other to define a channel therebetween. Each blade is flexible and has therein a plurality of formations disposed along at least a portion of the length thereof. The formations are configured to attain the following results. The passage of liquid through the first blade is permitted and the passage of liquid through the second blade is inhibited when the wiper moves across such surface in a first direction, by the formations in the first blade being opened and those in the second blade being closed by flexing of the blades during such movement in the first direction. Similarly, the passage of liquid through the first blade is inhibited and the passage of liquid through the second blade is permitted when the wiper moves across such surface in a second direction opposite to the first direction, by the formations in the second blade being closed and those in the first blade being opened by flexing of the blades during such movement in the second direction.

Yet another aspect of the present invention provides a wiper for wiping liquid from a surface and comprising a first blade having first and second sides and a plurality of passages therethrough from the first side to the second side and a second blade arranged substantially parallel to the first blade and defining a channel between the blades.

Still another aspect of the present invention provides a wiper for wiping liquid from a surface, the wiper comprising first and second substantially parallel blades, each blade having respective first and second opposite sides joined by a respective wiping face, each first side intersecting its wiping face to define an exterior edge and each second side intersecting its wiping face to define an interior edge. The wiper of this aspect of the invention has low friction material, e.g., polytetrafluoroethylene, disposed upon the first side of the first blade at the first edge thereof and on the first side of the second blade at the first edge thereof. In this way, the coefficient of friction of the first side of the first blade is lower than that of the second side of the first blade, and the coefficient of friction of the first side of the second blade is lower than that of the second side of the second blade.

Yet another aspect of this invention relates to an improvement in a wiper for wiping a liquid from a surface, the wiper comprising at least a primary liquid-diverting edge and a lateral liquid-diverting edge, the improvement comprising that the lateral liquid-diverting edge has at least one notch formed thereon to permit the flow of liquid therethrough. Optionally, such a wiper may have a plurality of notched lateral edges and a channel between the lateral edges.

This invention also provides an improvement in a windshield wiper assembly or a bridge arm assembly comprising two substantially parallel wipers each comprising a wiper blade, the blades defining a channel between them. The improvement comprises that one of the wipers comprises formations to permit water to pass through the blade. Optionally, there may be a guard strip extending from one wiper to the other in the region of the formations.

A method aspect of the present invention provides a method of wiping liquid from a surface utilizing a wiper comprising first and second blades substantially as described above. The method comprises the steps of moving the wiper in the first direction over a surface containing water to flow the liquid through the first blade and into the channel, moving the wiper in the second direction and flowing the liquid out of the at least one open end of the channel.

The method aspect of the invention includes cyclically moving the wiper alternately in the first and second directions.

A particular method aspect of the present invention includes flowing liquid out of the at least one open end of the channel during movement in both the first and second directions.

In another method aspect of the present invention there is utilized a wiper which further comprises an intermediate blade which is disposed between, spaced from, and parallel to the first and second blades and divides the channel longitudinally into first and second substantially parallel courses, the intermediate blade being dimensioned and configured to prevent the passage of liquid therethrough. This aspect of the method includes flowing liquid which passes through the first blade through the first course, and flowing liquid which passes through the second blade through the second course.

As used herein and in the claims, reference to permitting "the passage of liquid through" a blade or "the flow of liquid through" a blade, or words of like import, means that as the blade is moved across a liquid-containing surface with the wiping face of the blade in contact with the surface, at least some of the liquid contacted by the blade is able to remain on the surface despite passage of the blade thereover. This "passing-over" or "passing through (the blade)" action is the result of formations on the blade. In some embodiments the formations themselves provide clearance for the liquid relative to the passing blade, whereas in other embodiments the formations raise portions of the wiping face of the blade from the surface to provide clearance for the surface liquid under the raised portions of the moving blade. On portions of the blade lacking such formations, the blade inhibits or, preferably, prevents the passing through of liquid and can therefore wipe liquid from the surface. As used herein and in the claims, the term "inhibit" is meant to encompass the concept of preventing, and thus means preventing in whole or in part.

BRIEF DESCRIPTION OF THE DRAWINGS

FIG. 3 is a bottom view of the wiper of FIG. 1, with an intermediate portion thereof broken away, as viewed from the interior of the windshield of FIG. 1 but with the wiper in motion to illustrate water flowing through the leading blade into and through the channel formed between the two blades;

FIG. 4 is a transverse cross-sectional view, corresponding to that of FIG. 2, but with parts omitted to show only the wiper in motion to illustrate the flow of water through the leading blade and into the channel formed between the blades;

FIG. 5 is a transverse cross-sectional view, corresponding to that of FIG. 4, of a wiper in accordance with a second embodiment of the present invention;

FIG. 6 is a bottom view of the wiper of FIG. 5, with an intermediate portion thereof broken away, viewed from the interior of the windshield of FIG. 5;

FIG. 7 is a view corresponding to that of FIG. 5 but showing the wiper in motion to illustrate the flow of water through the first blade and into the channel defined between the blades;

FIG. 12A is a schematic rendition of a windshield having a pair of wiper arm assemblies for moving a pair of wipers across the windshield, as viewed from the interior of the vehicle on which the windshield is mounted;

FIG. 13 is a schematic view corresponding to that of FIG. 10 but showing an eighth embodiment of the present invention;

FIG. 13A is an end view in elevation of the embodiment of FIG. 13;

DETAILED DESCRIPTION OF THE INVENTION AND PREFERRED EMBODIMENTS THEREOF

Generally, the present invention provides a wiper comprising at least one blade which has one or more formations, such as notches, slits or protrusions, disposed along at least a portion of the length of the blade. The formations are configured so that as the blade is moved in reciprocating fashion across a surface, e.g., across the surface of a windshield, water (or other liquid) on the surface passes through the formations and under the blade when the blade is moving in one direction but does not pass through the formations, and is thereby wiped by the blade, when the blade is moving in the opposite direction. The present invention thus provides a wiper for a windshield wiper assembly or the like which provides controlled passage of water through the blade, i.e., which permits such passage of water through the blade when the blade moves in one direction but not when the blade moves in the opposite direction. In certain embodiments of the invention, a dual-blade wiper is provided with the waterflow-controlling formations provided either in only one or in both of the dual blades. In some embodiments, more than two substantially parallel blades may be provided. If the formations are provided on both blades of a dual-blade wiper, the formations are dimensioned and configured so that water passes through the leading blade and into and through the channel between the blades but cannot pass through the formations in the trailing blade. In this fashion, water is trapped within the channel and expelled from one or both ends of the channel. (In all cases, "leading" and "trailing" is used relative to the direction of movement of the wiper. Accordingly, the leading and trailing blades cyclically reverse roles in a reciprocating wiper.) In an optional embodiment, a single blade may comprise a primary edge and at least one lateral edge, and the lateral edge may be notched or comprise other formations according to this invention.

Figure 1:
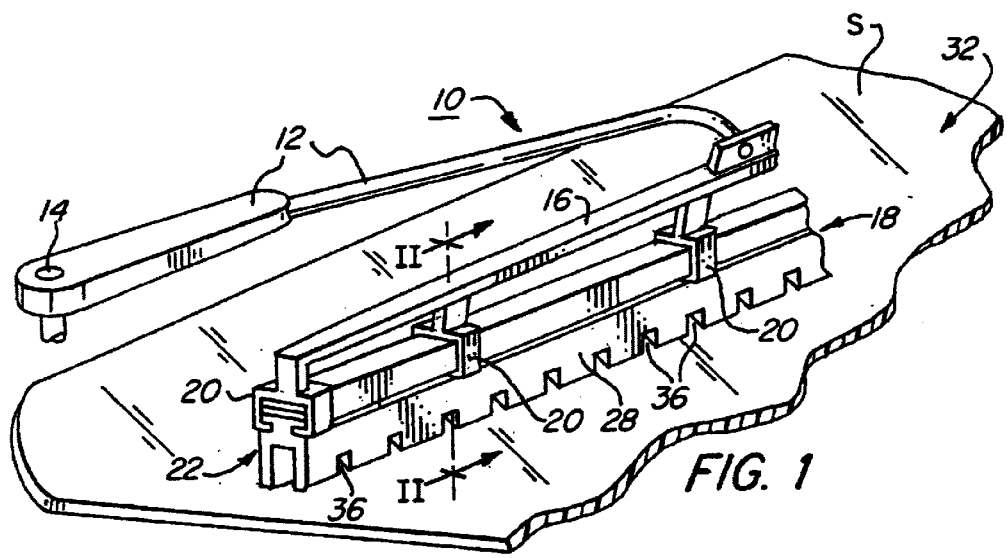
FIG. 1 is a partial perspective view, with parts broken away, of a wiper arm assembly including a dual-blade wiper in accordance with one embodiment of the present invention, the wiper being shown in contact with the exterior surface of a windshield.
Figure 2A:
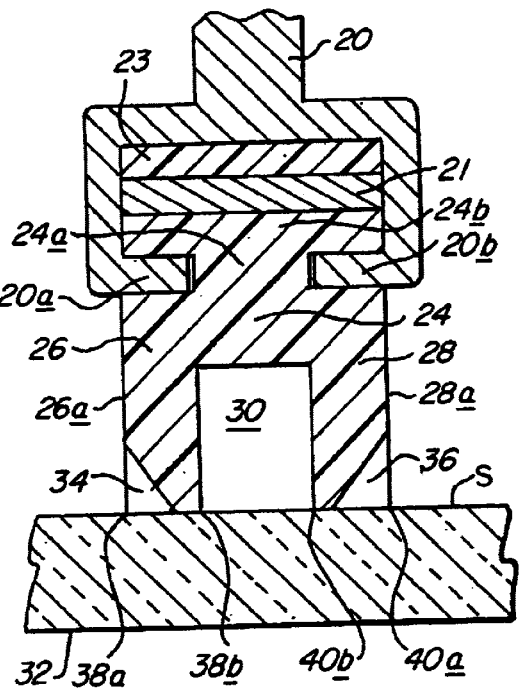
FIG. 2A is a partial view of the lowermost portion of the wiper of FIG. 2.
Figure 2:
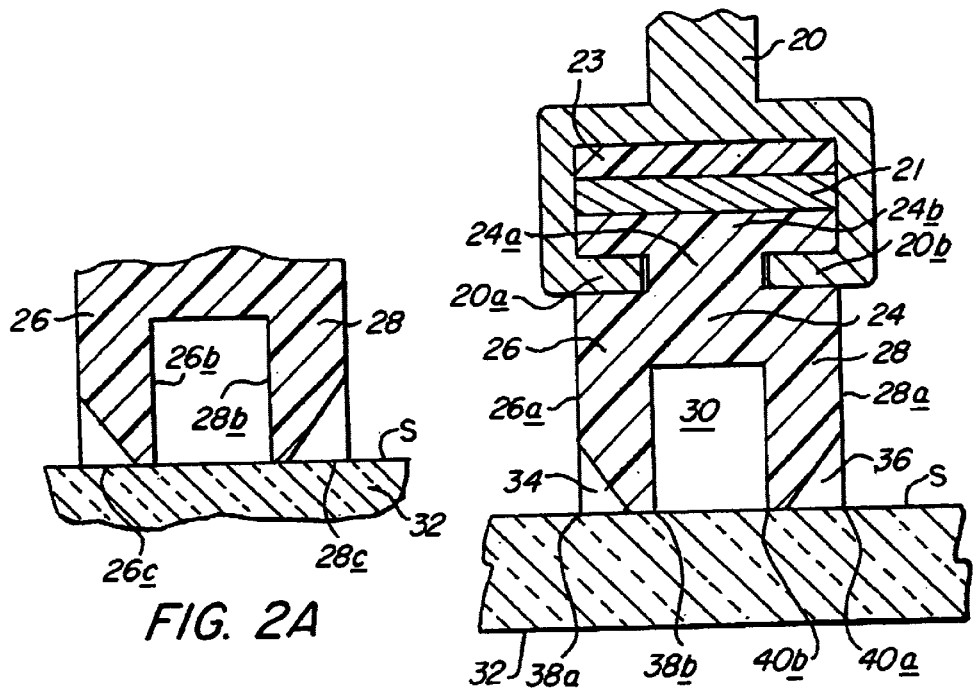
FIG. 2 is a transverse cross-sectional view taken along line II—II of FIG. 1.

Referring now to FIG. 1, a windshield wiper assembly is generally indicated at 10 and comprises an arm 12 one end of which is mounted on a support head 14 which is a standard item on motor vehicles and rotates in alternate opposite directions to traverse bridge arm 16 on which is carried a wiper assembly 18. Wiper assembly 18 is carried on bridge arm 16 by a series of clips 20 which retain a wiper 22 which is wiped across the exterior surface S of windshield 32. Referring now to FIGS. 2, 2A and 3, wiper 22 has a central portion 24 which is connected by neck 24a to head 24b, a first blade 26 and a second blade 28. Neck 24a is formed by a pair of opposite grooves (unnumbered in FIG. 2) within which are received opposite arms 20a, 20b of a plurality of clips 20. Clips 20 may be made of any suitable material, such as aluminum, steel or a plastic. In the illustrated embodiment, clips 20 are formed of steel and arms 20a, 20b thereof disclose a longitudinally extending steel strip 21 and a longitudinally extending plastic strip 23. Steel strip 21 serves to space apart arms 20a, 20b when they are crimped about head 24b of wiper 22. In the illustrated embodiment, the blades 26 and 28 are substantially parallel to and coextensive with each other and define therebetween a channel 30. First blade 26 has a first, exterior side 26a and a second, interior side 26b, the latter forming a sidewall of channel 30. Similarly, second blade 28 has a first, exterior side 28a and a second, interior side 28b, the latter forming the opposite sidewall of channel 30. As best seen in FIG. 2A, first blade 26 has a wiping face 26c and second blade 28 has a wiping face 28c. Wiping faces 26c, 28c contact surface S of windshield 32 and, when wiper 22 is stationary, lie flat against surface S.

First blade 26 has a series of notches 34 (FIGS. 2 and 3) spaced apart from each other and extending along the length thereof. Second blade 28 has a corresponding series of notches 36 formed therein and extending along the length thereof. Notches 34 extend from the first, exterior side 26a of blade 26 but stop short of the second, interior side 26b thereof leaving an uninterrupted strip of wiping face 26c extending uninterruptedly along second, interior side 26b, as best seen in FIG. 3. Similarly, notches 36 extend from the exterior side 28a of second blade 28 but stop short of the interior side 28b thereof to leave an uninterrupted continuous strip of wiping face 28c extending along interior side 28b. As best seen in FIG. 2, notches 34 and 36 are cut at an angle to provide a series of openings in, respectively, the exterior side 26a of first blade 26 and (as shown in FIG. 1) in the exterior side 28a of second blade 28.

The intersection of exterior side 26a and wiping face 26c provides, as shown in FIG. 2, an exterior edge 38a whereas the intersection of interior side 26b with wiping face 26c defines an interior edge 38b. Similarly, the intersection of exterior side 28a of second blade 28 with wiping surface 28c provides a second blade exterior edge 40a whereas the intersection of interior side 28b with wiping face 28c provides a second blade interior edge 40b.

Referring now to FIG. 4, wiper 22 is shown in motion as will be occasioned by normal reciprocating motion of windshield wiper assembly 10 (FIG. 1) caused by back-and-forth cyclic rotation of support head 14. When wiper 22 is moving in the direction indicated by arrow L (leftwardly as viewed in FIG. 4), first blade 26 is the leading blade while second blade 28 is the trailing blade. As first blade 26 (the leading blade) traverses the surface S of windshield 32, it tends to bend or flex so that first exterior side 26a thereof approaches surface S, thus lifting interior edge 38b away from the surface S while leaving the exterior edge 38a in pressure contact with the surface S. Thus when water $W_1$ is encountered, it flows through notches 34 and thus through first blade 26 into channel 30 (as shown by arrow $F_1$), where it accumulates as trapped water $W_2$ within channel 30. Trapped water $W_2$ is unable to flow past second blade 28 (the trailing blade) because, as wiper 22 moves in the direction of arrow L, second blade 28 flexes so that the continuous interior edge 40b thereof and/or of wiping face 28c (FIG. 2A) is in uninterrupted pressure contact with surface S, thus inhibiting or preventing water from flowing under second blade 28. Second blade 28, in its trailing mode, therefore pushes trapped water $W_2$ as wiper 22 continues in the direction L. Trapped water $W_2$ will accumulate and flow through channel 30 to exit at one or both of the open ends thereof, as indicated by arrows $F_2$ in FIG. 3. The reciprocating motion of wiper 22, as windshield wiper assembly 10 operates, will help to eject water $W_2$ out of channel 30. When the vehicle on which windshield wiper assembly 10 is mounted is traveling forward, air flowing across the windshield will also help to extract water $W_2$ from channel 30. At least one, but preferably both ends, of channel 30 are open as illustrated to permit the expulsion of water $W_2$ from channel 30. When the direction of motion reverses so that wiper 22 is traveling in the direction opposite to that indicated by the arrow L in FIG. 4, second blade 28 becomes the leading blade and flexes to admit water into channel 30 via notches 36 while first blade 26 becomes the trailing blade and it flexes to push trapped water $W_2$ as it travels. The two blades 26, 28 thus allow controlled passage of water, i.e., they allow water to pass through the leading blade but not the trailing blade to flow the water on surface S in one direction from outside wiper 22 into channel 30 and to escape from channel 30 only via one or both of first and second ends 42, 44 thereof. Described differently, the notches 34, 36 behave like valves, allowing water to flow alternately through the notches 34, 36, depending on the direction of movement, and into channel 30 when the wiper 22 moves across the surface S. Water is not permitted to flow back of the notches 34, 36 but only out of channel 30 via one or both of the ends 42, 44 thereof.

Wiper 22 has a first end 42 and an opposite, second end 44 (FIG. 3). When wiper 22 is installed upon, e.g., the windshield wiper of a vehicle such as an aircraft, train, automobile, or watercraft (not shown), it is exposed to aerodynamic pressures induced by the motions of such vehicle. For example, in the case of wiper 22 being installed on the windshield of an ordinary passenger vehicle, first end 42 may be near the top of the windshield and second end 44 near the bottom. When the vehicle is in motion, aerodynamic pressure (an induced wind) will act to push trapped water $W_2$ longitudinally along channel 30 towards first end 42 as indicated by arrow $F_2$. On the other hand, when the vehicle is at rest, gravity will pull trapped water $W_2$ in the opposite direction down channel 30 (as sensed in FIG. 3), resulting in water flow out of second end 44 as indicated by arrow $F_3$.

While first and second wiper blades 26 and 28 are illustrated as being parallel to each other, they may be at a slight angle to one another. Reference herein and in the claims to blades which are "substantially parallel" to each other includes parallel blades and blades set at a slight angle, e.g., five degrees, relative to each other. First and second wiper blades 26 and 28 are illustrated as being relatively wide, with well-defined wiping faces 26c and 28c. However, the present invention is not limited to wide wiper blades having wiping faces, and may be used with narrow wiper blades having only a wiping edge or wiper blades having a triangular or any other suitably shaped cross section.

FIGS. 5, 6 and 7 illustrate another embodiment of the present invention. Wiper 122 has a central portion 124, a neck 124a, a head 124b, a first blade 126 having an exterior side 126a and an interior side 126b, and second blade 128 having an exterior side 128a and an interior side 128b. First blade 126 and second blade 128 define a channel 130 between them. Instead of notches, the formations of first blade 126 comprise protrusions 134 along its length at exterior edge 138a thereof. Second blade 128 likewise has protrusions 136 along its length at exterior edge 140a thereof. "At" in this context has its usual meaning of on, near or by, and indicates that the protrusions are sufficiently close to the exterior edges 138a, 140a of the blades 126, 128 to contact the windshield 32 when the respective blade is a leading blade, as described below. First blade 126 has a wiping face 126c and an exterior edge 138a formed at the intersection of wiping face 126c and exterior side 126a. First blade 126 further has an interior edge 138b formed at the intersection of wiping face 126c and interior side 126b. Second blade 28 similarly has a wiping face 128c, which at its respective intersections with exterior side 128a and interior side 128b forms exterior edge 140a and interior edge 140b. When wiper 122 is at rest, wiping faces 126c and 128c make contact with, and lie flat against, surface S of windshield 32.

FIG. 7 illustrates wiper 122 in motion in the direction of arrow L. Referring to FIGS. 6 and 7, first blade 126 (the leading blade) flexes to bring protrusions 134 thereof to bear on surface S which lifts first, exterior edge 138a out of contact with surface S. The raising of exterior edge 138a allows water $W_1$ to enter channel 130 under first blade 126 via the spaces between protrusions 134 (i.e., to "pass through" the blade), as shown by arrow $F_1$. Protrusions 136 of second blade 128 (the trailing blade), however, do not contact surface S when wiper 122 is moving in this direction. Instead, second blade 128 flexes so that second, interior edge 140b contacts surface S so that second blade 128 accumulates trapped water $W_2$ in channel 130 (i.e., blade 128 "inhibits" water from passing therethrough). Thereafter, trapped water $W_2$ may flow out of first and second ends 142 and 144 (FIG. 6) in the same manner as illustrated in FIG. 3. When the direction of travel of wiper 122 is reversed, the functions of the blades are similarly reversed in the manner described above for the embodiment of FIGS. 1–4. Controlled passage of water is thus achieved in a manner similar to the embodiment of FIGS. 1 through 3.

Figure 8:
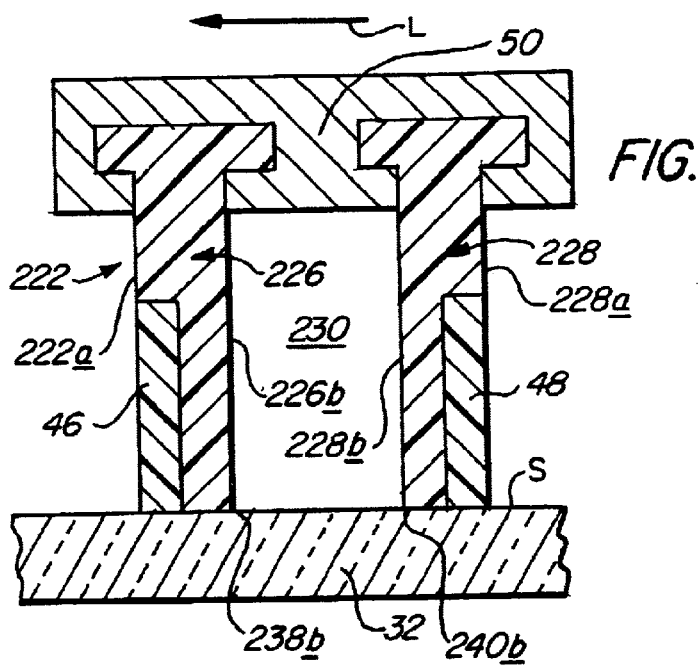
FIG. 8 is a cross-sectional view of a wiper comprising a third embodiment of the present invention.

Blades 126 and 128, like blades 26 and 28, are integrated unitary bodies of a suitable flexible material, such as natural or synthetic rubber or other suitable elastomer, in which the pairs of wiper blades are joined by a central portion 124 formed integrally therewith in a body which has an "up-side down U" cross-section. In an alternative embodiment of the invention, the wiper blades may also be mechanically mounted side by side in a blade carrier 50 as is known in the art and illustrated in FIG. 8. Wiper 222 has first blade 226 having an exterior side 226a, interior side 226b and a wiping face 226c. Second blade 228 has an exterior side 228a, an interior side 228b and a wiping face 228c. A channel 230 is formed between blades 226 and 228.

In this embodiment, controlled passage of water is achieved using a material having a low coefficient of friction, e.g., a fluoropolymer, such as that available commercially under the trademark TEFLON from E.I. DuPont de Nemours and Company, of Wilmington, Del., or equivalent material. First blade 226 has thereon a layer 46 and second blade 228 has thereon a layer 48 of a material having a coefficient of friction which is significantly lower than that of the remainder of blades 226 and 228. Layers 46 and 48 may be composed partially or wholly of polytetrafluoroethylene ("PTFE"). Layers 46 and 48 are, for convenient reference, referred to below as "PTFE layers" 46, 48. The remainder of the blades 226, 228 may be made of any suitable materials, such as any suitable polymeric or elastomeric material. First and second blades 226 and 228 of wiper 222 are held by blade carrier 50. Blade carrier 50 may be made of any suitable material, such as a suitable metal or plastic having sufficient strength for the purpose, and may be manufactured by extrusion, milling or other methods.

The PTFE layers 46 and 48 may be coated onto first and second blades 226, 228 or they may comprise inserts bonded onto the blades as illustrated in FIG. 7, or they may be applied by any other suitable means. PTFE layers 46 and 48 may comprise a larger or smaller portion of the cross section of the blades 226, 228, anything from a thin coating to constituting a majority of thickness of the blades. When the first blade 226 flexes in a first direction, as would be caused by movement of wiper 222 in the direction indicated by arrow L in FIG. 8, the PTFE layer 46 remains in contact with the surface S of windshield 32 and the interior edge 228b of blade 226 is lifted away from the surface S. Such movement leftward will cause the second blade 228 to flex leftwardly as viewed in FIG. 8, lifting the PTFE layer 48 away from the surface S and having at least the interior edge 240b of second blade 228 remaining in contact with the surface S. When the wiper moves in the opposite direction, blade 228 flexes in the opposite direction from that shown for blade 128 in FIG. 7, and the situation is reversed, i.e., PTFE layer 48 is brought into contact with surface S and PTFE layer 46 is lifted away from surface S.

Without wishing to be bound by any particular theory, it is believed that this embodiment may function as a result of the low coefficient of friction of the PTFE layers 46 and 48 and, possibly, the suction exerted on first blade 226 (and the water under it) by low pressure within channel 230 induced by air velocity therethrough. When wiper 222 moves in a first direction across surface S, as indicated by arrow L in FIG. 8, water passes underneath first blade 226 at PTFE layer 46. Water is trapped in channel 230 by the interior edge 240b (having no PTFE constituent) of the second blade 228. When wiper 222 moves in a second direction opposite to the direction indicated by arrow L, the operation in reversed.

Figure 9A:
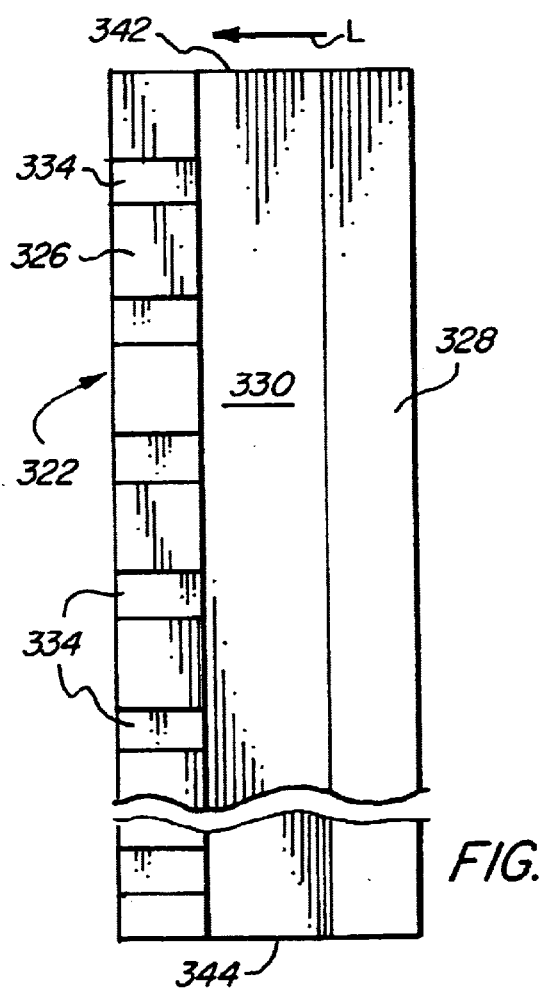
FIG. 9A is a bottom view, corresponding to that of FIG. 6, but showing a fourth embodiment of the present invention.

FIG. 9A illustrates a wiper 322 having first blade 326 and second blade 328 defining therebetween a channel 330. First blade 326 has passages 334 extending therethrough. Unlike the embodiments disclosed previously, passages 334 are continuously open to flow of water therethrough as they penetrate first blade 326 and are open to fluid flow, regardless of whether first blade 326 flexes or wiper 322 is moving in the direction of arrow L or in the opposite direction.

When wiper 322 is moving laterally across a surface in the direction shown by arrow L, water will pass through first blade 326 via passages 334 and enter channel 330, where it will be trapped by second blade 328. Such trapped water will be held within channel 330 and be unable to escape through passages 334 because of the motion of wiper 322 in the direction indicated by arrow L and the entrance of additional water through passages 334. As discussed above with reference to other embodiments, the trapped water is discharged from wiper 322 via ends 342, 344 thereof. When wiper 322 is moving in the direction opposite to that indicated by the arrow L, it operates as a conventional wiper because second blade 328 traps and pushes water away without admitting the water into channel 330. This embodiment illustrates that one blade of a dual-blade wiper in accordance with an embodiment of the invention may be a conventional wiper blade 328, i.e., one without water-flow formations therein. In this particular embodiment, having one blade (326) allowing passage of water therethrough and one conventional blade (328) permits passage of water through the leading blade and into the channel 330 when the wiper moves in one direction only.

Figure 9B:
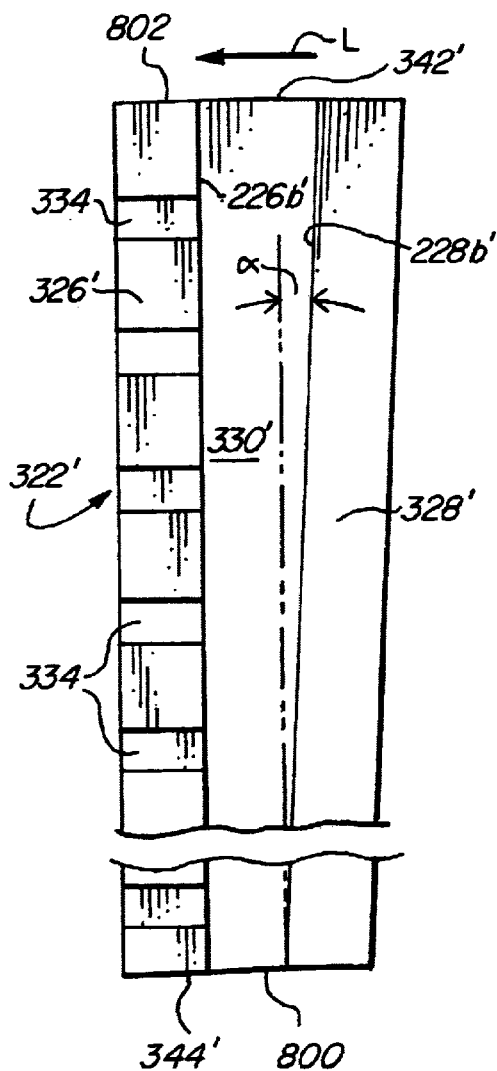
FIG. 9B is a bottom view, corresponding to that of FIG. 6, but showing another embodiment of the present invention.

A further embodiment of the wiper 322 is shown in FIG. 9B. The wiper 322', shown by bottom view, has a first blade 326' having an interior side 226b'. The second blade 328' has an interior side 228b'. The interior sides 226b' and 228b' are not parallel as compared to the embodiment of FIG. 9A but diverge at an angle α so that the end 344' at the bottom of the wiper 322' has an opening 800 that is smaller than the opening 802 in the first end 342' at the top of the wiper 322'. As the water enters into the channel 330', the increasing size of the channel 330' in the direction of the first end 342' will allow additional water to flow out the opening 802 since the movement of the wiper 322' causes the centrifugal force to act in that direction. If a sufficient amount of water is collected in the lower part of the wiper 322', this will block other water at the top from entering into the channel 330' through the passages 334. Having the provision of the channel 330' increasing in size to the opening 802 will allow additional water to be removed. The size of the angle a will depend on several factors: the different rotational rates of the wipers, the location of the passages 334 along the blades whether uniform or varied, the expected rainfall, the height of the sides 226b', 228', and the length of the wiper 322'.

Figure 10A:
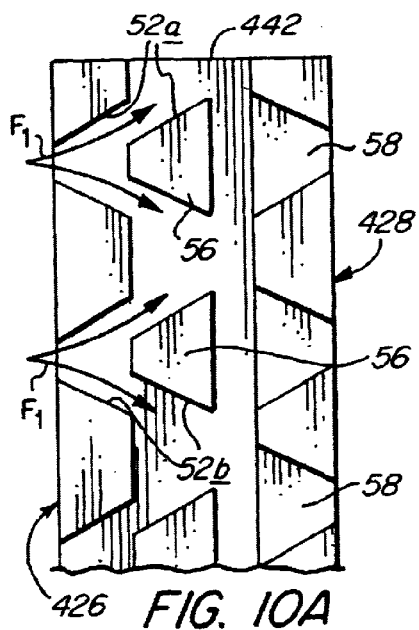
FIG. 10A is a schematic view corresponding to FIG. 10, but showing the wiper in motion to illustrate the flow of water through the leading blade and into and through the channel defined between the blades.
Figure 10:
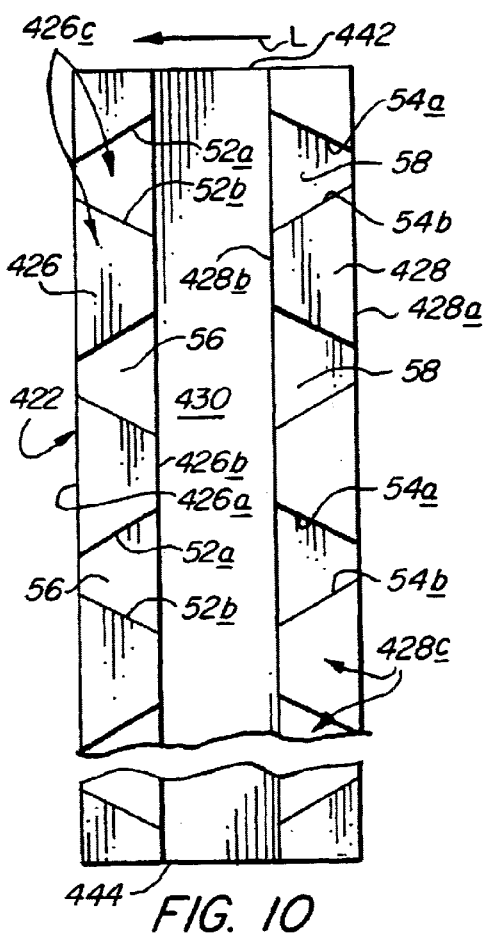
FIG. 10 is a bottom view, corresponding to that of FIG. 9A, but showing a fifth embodiment of the present invention.

FIG. 10 illustrates a wiper 422 having first blade 426 and second blade 428 defining a channel 430 therebetween. First blade 426 has angled slits 52a, 52b formed therein across the wiping face 426c thereof, and second blade 428 has angled slits 54a, 54b formed therein across the wiping face 428c thereof. The slits are of a height less than the height of the blades 426 and 428. The angled slits are arranged in pairs; each pair of angled slits 52a, 52b is arranged so as to be closer together at exterior side 426a and further apart at interior side 426b of first blade 426, so that each pair of angled slits 52a, 52b defines therebetween a wedge-shaped flap member 56 in first blade 426. Angled slits 54a, 54b of second blade 428 provide similar wedge-shaped flap members 58 which are wider at interior edge 428b than at exterior edge 428a. Wedge-shaped flap members 56 and 58 are connected to their respective blades 426, 428 at the upper ends of, respectively, slits 52a, 52b and 54a, 54b. (The upper ends of the slits are the ends remote from wiping faces 426c, 428c.)

When wiper 422 moves across a windshield surface or the like in the direction indicated by arrow L, blade 426 flexes in that flap members 56 are pushed away from blade 426 by frictional forces engendered by contact with the windshield, thus opening or widening angled slits 52a, 52b and allowing water to enter channel 430, as shown by arrows $F_1$ in FIG. 10A. (The schematic rendition of FIG. 10A is equivalent to a longitudinal cross-sectional view taken below the full height of slits 52a, 52b, and 54a, 54b so that the material connecting wedge-shaped flap members 56 to first blade 426 are not visible.) The slits are high enough, i.e., extend far enough away from the wiping faces 426c, 428c to permit the illustrated shifting of flap members 56 (FIG. 10A) and similar shifting of flap members 58 when wiper 422 moves across the windshield in the direction opposite to that indicated by the arrow L in FIG. 10. As to flap members 58 of second blade 428, the frictional forces engendered by motion of wiper 422 in the direction of arrow L in FIG. 10 press flap members 58 firmly against blade 428 thereby closing angled slits 54a, 54b of second blade 428. Thus, water is trapped by second blade 428 within channel 430 (FIG. 10), and wiper 422 functions as described previously in connection with the other embodiments to divert water from the windshield and discharge it via the ends 442, 444 (FIG. 10) of wiper 422. When wiper 422 moves in the direction opposite to that indicated by arrow L, flap members 56 are closed and flap members 58 are opened, and water flow passes through second blade 428 into channel 430.

Figure 11:
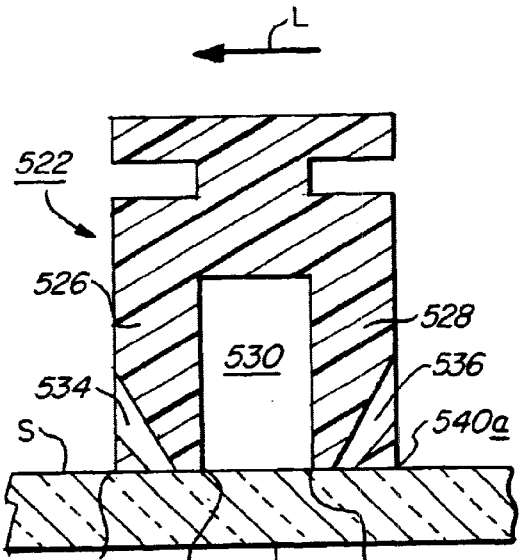
FIG. 11 is a transverse cross-sectional view corresponding to that of FIG. 5 but showing a sixth embodiment of the present invention.

In FIG. 11, wiper 522 has first blade 526 and a second blade 528 defining therebetween a channel 530. First blade 526 has an exterior edge 538a and an interior edge 538b; second blade 528 has an exterior edge 540a and an interior edge 540b. Passages 534 on first blade 526 and passages 536 on second blade 528 comprise apertures or holes rather than notches but otherwise function identically to the notches of the embodiment of FIGS. 1 through 3 to control water passing through the blade. When moving in the direction indicated by the arrow L the flexing of the blade 526 will bring the angled passages 534 closer to the surface S of windshield 32 thereby permitting water on the surface S to flow through the passages 534 into channel 530 for discharge from the ends (not shown in FIG. 11) of the channel. Flexing of the trailing second blade 528 will keep the interior edge 540b of second blade 528 in contact with the surface S and prevent the flow of water therethrough. When wiper 522 moves in the direction opposite from that indicated by the arrow L, the reverse water flow will occur in a manner similar to that described above with respect to the other embodiments.

Figure 12:
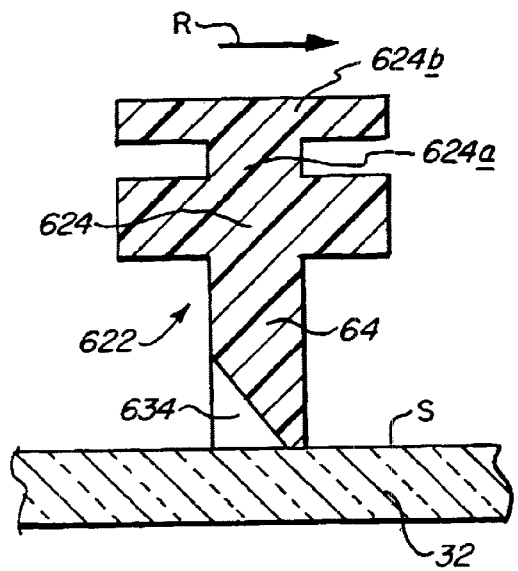
FIG. 12 is a transverse cross-sectional view corresponding to that of FIG. 5 but showing a seventh embodiment of the present invention.

FIG. 12 illustrates yet another embodiment of the invention wherein a single-blade wiper instead of a double-blade wiper described above is utilized. In this embodiment, wiper 622 comprises a central portion 624, a neck 624a, a head 624b and a single blade 64 having a series of notches 634 spaced longitudinally there along. The embodiment of FIG. 12 will thus wipe water off the surface S of windshield 32 only when moving in the direction indicated by the arrow R in FIG. 12. When moving in a direction opposite from that indicated by the arrow R, wiper 622 will allow the water to pass through notches 634 and largely remain on the surface S. Although this reduces the efficiency of wiper 622 in removing water from the surface S, it may advantageously be used, for example, as a passenger-side wiper. Thus, as sensed by a passenger sitting to the right of a driver, when wiper 622 moves in the leftward direction, it leaves behind much of the water on the surface over which it travels thereby avoiding dumping that water on the cleared portion of the windshield in front of the driver (corresponding to cleared area 60 in FIG. 1A, as described below). When moving rightwardly as sensed by the passenger, i.e., in the direction of arrow R, the wiper 622 wipes the water and pushes it toward the right hand side (side 132b in FIG. 1A) of the windshield. In this arrangement, the wiper on the windshield wiper in front of the driver is advantageously effective by movement of the wiper in both directions. The wiper used on the windshield wiper in front of the driver may advantageously comprise any one of the embodiments discussed above.

Referring now to FIG. 12A, there is shown a windshield 132 of a vehicle as viewed from the interior of the vehicle so that windshield wiper assembly 110 is on the driver's side (of a U.S.-style left hand steering wheel vehicle) and windshield wiper assembly 210 is on the passenger side. Windshield 132 has opposite side edges 132a, 132b. Windshield wiper assembly 110 is driven by support head 114 and windshield wiper assembly 210 is driven by support head 214. As is conventional, windshield wiper assemblies 110 and 210 reciprocate in the direction indicated by the double-headed arrows to generate arc-shaped respective cleared areas 60, 62. In a preferred arrangement, windshield wiper assemblies 110 and 210 will utilize respective wipers 22a and 22b which are of dual-blade construction and have therein formations as described above, e.g., in connection of the embodiment of FIGS. 1–4, so that wiper 22a will not deposit displaced water into the cleared area 62 of windshield wiper assembly 210, and wiper 22b will not deposit cleared water into the cleared area 60 of wiper assembly 110. Conventional windshield wipers would deposit water into the cleared areas 60, 62 of the other as indicated by the arrows Wc in FIG. 12A. The windshield wipers would thus be working against each other. If both wipers 22a and 22b are dual-blade wipers in accordance with an embodiment of the present invention, water will be discharged from the opposite ends of the channels (not shown in FIG. 12A) of wipers 22a and 22b as indicated by the arrows Wd and will be discharged to the left and right of windshield 132 as indicated by the arrows Wr. If wipers 22a, 22b are single-blade wipers as illustrated in FIG. 12, their perforations will be on the right side (as viewed in FIG. 12A) of wiper 22a and on the left side of wiper 22b, so that each wiper will move water only to the opposite side edges 132a, 132b of windshield 132. A combination of different type wipers may be utilized, for example, wiper 22a may be a dual-blade wiper in accordance with the dual-blade embodiment of the present invention, and wiper 22b may be a single-blade wiper in accordance with the embodiment of the invention as illustrated in FIG. 12, with the perforations arranged on the left hand side thereof (as viewed in FIG. 12A) so that water will not be discharged from wiper 22b in the direction indicated by the arrows Wc.

Referring now to FIGS. 13 and 13A, there is shown a three-blade embodiment of the present invention. A wiper 722 has (FIG. 13A) a central portion 724, a neck 724a and a head 724b. As best seen in FIG. 13, first blade 726 has a series of notches 734 formed therein at the exterior edge 738a thereof and second blade 728 has a series of notches 736 formed therein at the exterior edge 740a thereof. First blade 726 and second blade 728 form therebetween a channel 730. An intermediate blade 27 is disposed between, spaced from, and substantially parallel to first blade 726 and second blade 728. First blade 726, second blade 728 and intermediate blade 27 have respective wiping faces 726c, 728c and 27c. Notches 734 and 736 extend into, respectively, wiping faces 726c and 728c, as in the embodiment of FIGS. 2, 2A, 3 and 4. Intermediate blade 27 divides channel 730 into a first course 30a and a second course 30b, courses 30a and 30b being disposed substantially parallel to each other and, in the illustrated embodiment, extending along the entire length of wiper 722, from (FIG. 13) first end 742 to second end 744 thereof. The operation of wiper 722 is substantially similar to that described above in connection with the embodiment illustrated in FIGS. 2, 2A, 3 and 4, except that water which flows through passages 734 is constrained to flow only through course 30a. This is because, in the illustrated embodiment, intermediate blade 27 has no formations formed therein to permit the passage of water therethrough. Consequently, wiping face 27c will remain pressed against the water-containing surface and will therefore constrain water admitted into course 30a to flow therein, to exit from either or both of end 742 and end 744. Water which through perforations 736 is similarly constrained by intermediate blade 27 to flow through course 30b of channel 730.

Figure 14:
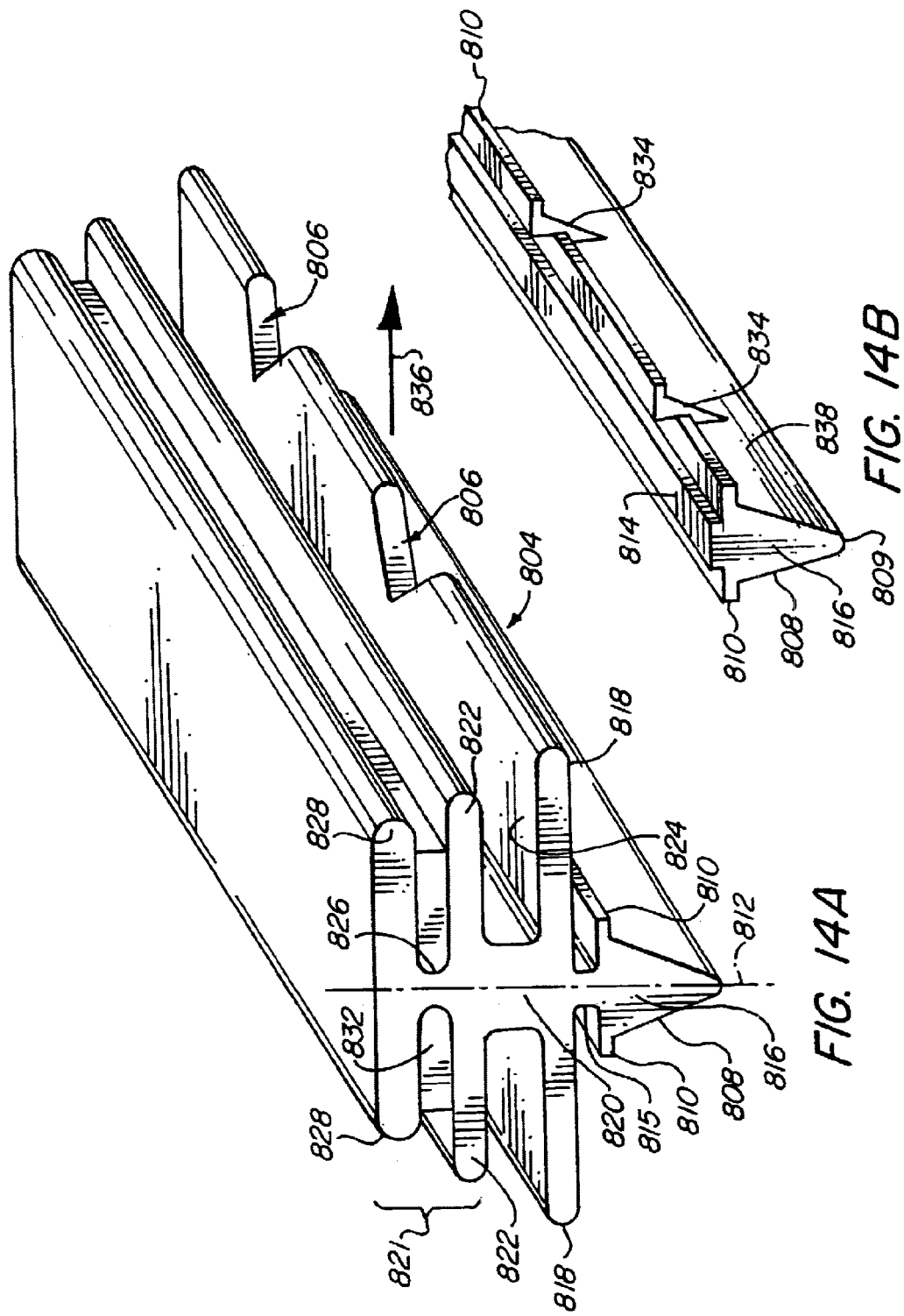
FIGS. 14A and 14B illustrate by perspective view a conventional wiper blade having notched edges being another embodiment of the present invention.

FIG. 14A provides a perspective view of a BOSCH Micro Edged® wiper, model 40718A, modified by the addition of a plurality of notches 806, 834 to provide a wiper 804 according to another embodiment of the present invention. The wiper 804 has a single blade 808 of triangular shape. Blade 808 has a principal water-diverting edge 809 and two lateral water-diverting edges 810 located at the top of the blade 808 for contact with the windshield. Lateral edges 810 are essentially perpendicular to a vertical line 812 being centered on the end of the wiper 804. Directly above the lateral edges 810 is a first neck 814 which is smaller in cross section than the top of blade 808. Wiper 804 further defines a pair of secondary blades which provide additional lateral water-diverting edges 818 being of substantially greater width than the pair of lateral edges 810. In normal operation edge 809 is in contact with the windshield regardless of the direction in which the wiper 804 moves. Edge 809 is thus bidirectional, or direction-independent in use. Neck 814 allows blade 808 to flex from the vertical line 812 as wiper 804 is drawn across the windshield in a given direction, and when it so flexes, one lateral edge 810 contacts the windshield as well. When blade 808 is flexed, a lateral edge 818 may also contact the windshield, or it may be positioned close enough to the windshield to be able to move water even without contact with the windshield. When wiper 804 moves in the opposite direction, the other lateral edge 810 and lateral edge 818 touch or approach the windshield. The lateral edges 810 and 818 are thus uni-directional, or direction-dependent in use. Referring to FIG. 14B, notches 834 are placed on the lateral water-diverting edge 810 and into a sidewall of the blade 808 as seen therein. Optionally, these notches 834 may be on one or both sides of wiper 804 and have a variety of spacing patterns along the wiper. As seen in FIG. 14A, notches 806 are made in the lateral water-diverting edge 818. The notches 806 may also be on the other side and positioned along the edges 818 in a variety of patterns such as uniformly spaced, none at the top half, more in the bottom half of the blade, etc. The notches 806 need not be triangular-shaped as shown, but may be half circles and/or rectangular-shaped, etc. The top of the wiper 804 is marked and the arrow 836 is pointing in a direction of movement. Neck 814 provides a channel 815 between lateral edges 810 and 818 through which the water flows along the length of wiper 804 as it moves. A second neck 820 connects the lateral water-diverting edges 818 to the mounting portion 821 of the wiper. Mounting portion 821 comprises lower support edges 822, upper support edges 828 and support rails 832.

The lower support edge 822 is connected to a third neck 826 which is connected to an upper support edge 828 which together form a channel into which a metal support rail 832 is inserted on both sides of the third neck 826. Neck 820 also provides a channel 824 between lateral water-diverting edges 818 and the lower support edge 822 into which the blade holding clips, not shown, of the wiper arm are positioned. Channel 824 also provides a longitudinal conduit for the diversion of water. The support rails 832 provide substantial rigidity to the wiper 804 in the direction perpendicular to the vertical line 812 and are also firmly held in place by the wiper arm clips, not shown.

Notches 806 and/or 834 increase the removal rate of water by providing access to channels 815 and 824, along which the water may flow towards one end of the blade or the other as the wiper moves across a windshield so that the water can be expelled from the end of the wiper.

Figure 15:
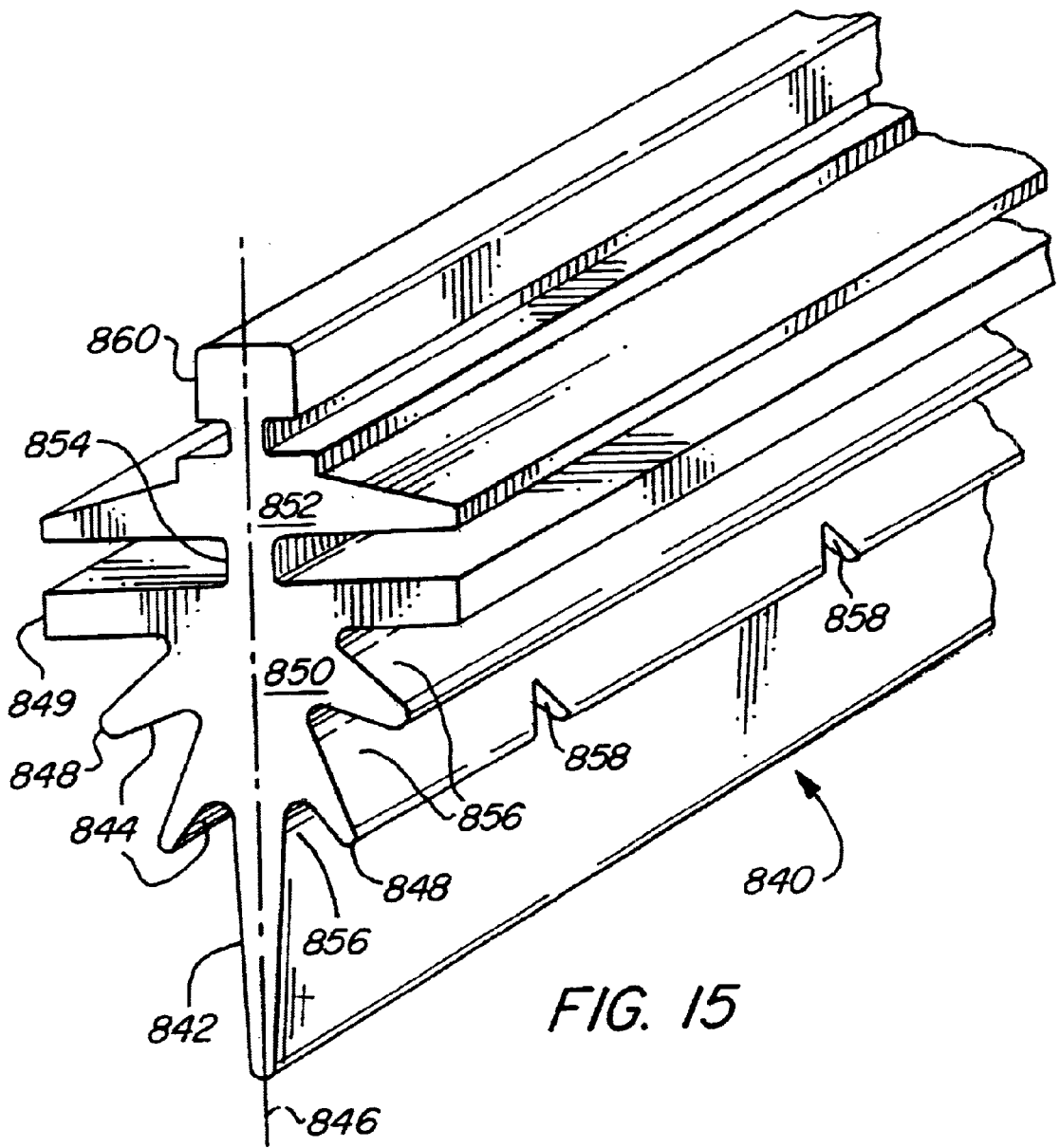
FIG. 15 illustrates by perspective view another conventional wiper blade having a plurality of angled secondary blades with the notched edges being another embodiment of the present invention.

Referring to FIG. 15, a multi-blade wiper 840 in accordance with the present invention is shown. Wiper 840 is based on a wiper sold under the name "MAGIC WIPER™" by the Magic Wiper Company to which notches 858 were added to conform the MAGIC WIPER™ to the present invention. Wiper 840 comprises a primary blade 842 which is vertically oriented and serves to trap most of the water as it moves across the windshield surface. The secondary blades 844 provide additional lateral wiping edges 848 and are angled from the vertical line 846 from about 30° to less than 90° and have a length such that at least one edge 848 will contact the windshield when the primary blade 842 flexes away from the vertical, opposite the direction of movement. This flexing is further aided by having a base area 850 connected to the upper area 852 by means of a thin flexible neck 854. A water-diverting edge 849 is located directly above the secondary blades 844. A head 860, which runs the full length of the wiper 840, is enclosed in a plastic housing or blade carrier, not shown, and this provides the necessary rigidity as provided by the metal rails 832 in the wiper 804 (FIG. 14A). The plastic housing is configured to receive clips for attachment to a bridge arm like bridge arm 16 (FIG. 1). The notches 858 may be placed in one or more of the secondary blades 844 as well as having a variety of patterns along the length of the wiper 840. These notches 858 similarly aid in the water removal as discussed in relation to the wiper 804 (FIG. 14A).

Figure 16:
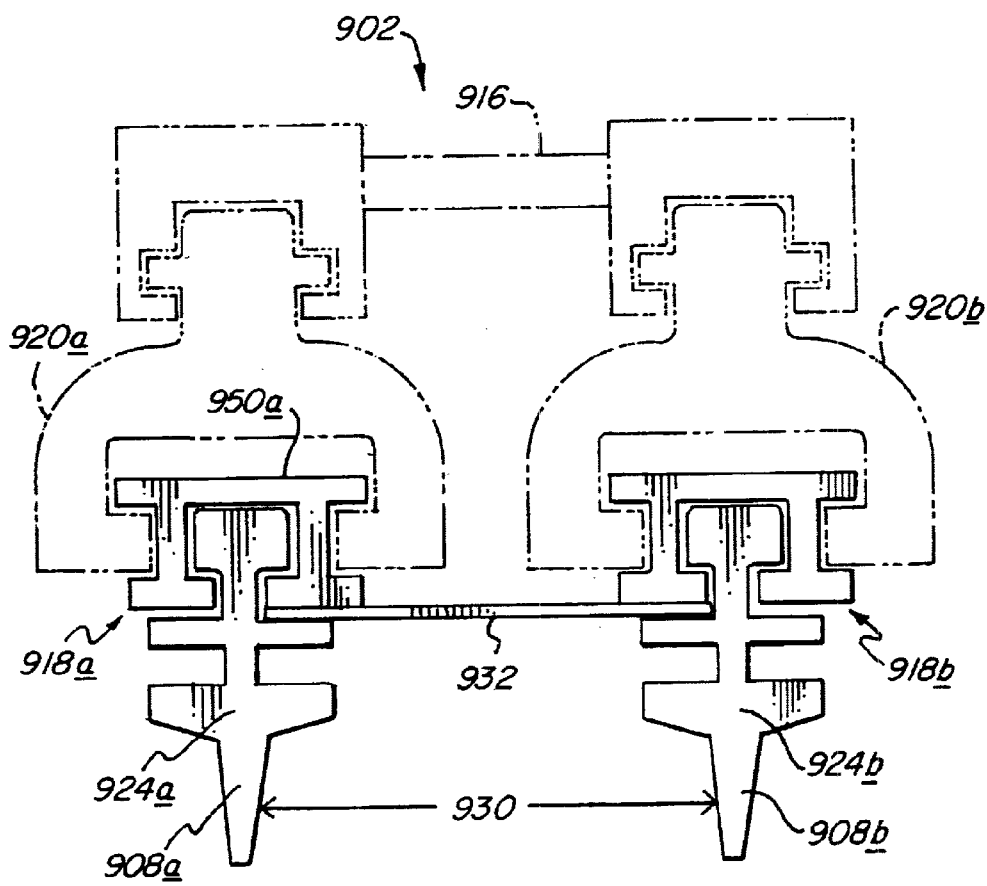
FIG. 16 is a schematic cross-sectional view of a dual-wiper bridge arm assembly according to still another embodiment of the invention.

Still another embodiment of the invention provides an improvement in a windshield wiper assembly having two separate wiper assemblies carried side by side, preferably on the same bridge arm, providing side-by-side wiper blades. The improvement is that one of the blades is equipped with periodic notches or other formations. When notches are employed, the windshield wiper assembly of this embodiment is analogous to the embodiment of FIG. 9A. Such embodiments find special utility when used in combination with a second windshield wiper assembly where the wiping regions of the two overlap (e.g., a driver-side assembly and a passenger-side assembly). The blade farthest from the other wiper assembly (i.e., the outside blade) is the one which should be notched and it is preferably a passenger-side assembly rather than a driver-side assembly. Optionally, the outside blade may have notches (or other formations) distributed along its entire length to permit water to flow into the channel between the blades, but the invention may be practiced by providing an outside blade having formations at least on the portion of the blade which, during use, travels over the portion of the windshield wiped by the other windshield wiper assembly (typically about the top one-third of the blade). Such an arrangement reduces the degree to which the improved assemblies will deposit water on the region previously wiped by the adjacent windshield wiper assembly, and thus improves the performance of the entire wiping mechanism. A bridge arm assembly illustrating this embodiment of the invention is shown in FIG. 16. Bridge arm assembly 902 comprises a bridge arm 916 for attachment to a wiper arm such as arm 12 (FIG. 1). Bridge arm assembly 902 carries two wiper assemblies 918a, 918b, each mounted on bridge arm 916 by one or more clips 920a, 920b. In the illustrated embodiments, wiper assembly 918a is similar in configuration to wiper assembly 918b, so they will be described together except to the extent that one differs from the other. Each wiper assembly 918a, 918b comprises a wiper 924a, 924bhaving a head 960a, 960b formed above a retaining flange 921a, 921b. A blade carrier 950a, 950b is dimensioned and configured to receive head 960a, 960b to provide sufficient rigidity to the wiper assembly and to facilitate attachment to bridge arm 916 via clip 920a, 920b and other clips (not shown).

Below retaining flanges 921a, 921b, wipers 924a, 924b define channels 914a, 915a and 914b, 915b, beneath which extend the blades 908a, 908b having principal edges 909a, 909b and lateral edges 910a, 910b. Wiper assembly 918b is positioned substantially parallel to wiper assembly 918a. When bridge arm assembly 902 is disposed against a windshield, a channel 930 is formed between blades 908a and 908b. As previously mentioned, one of blades 908a and 908b comprises a plurality of notches to permit water to flow therethrough.

FIG. 16 also shows a containment strip 932 which extends from wiper assembly 918a to wiper assembly 918b and which encloses channel 930. Preferably, strip 932 resides in a region in which blade 908a or 908b is notched, most preferably of the top one-third of the blade. In use, the notches on the outside blade and strip 932 cooperate to reduce the degree to which bridge arm assembly 902 would work against the wiping function of an adjacent windshield wiper assembly in the region of overlap by depositing water there.

The configuration, selection, size, orientation, and number of the passages, apertures, slits or other formations may easily be selected to suit the particular working environment. Various combinations of notches, passages, protrusions and flap members may be used on one blade. In addition, the channel between the blades may be segmented into two channels, one channel communicating with a respective end of the wiper.

While the invention has been described in detail with reference to particular embodiments thereof, it will be apparent that upon a reading and understanding of the foregoing, numerous alterations to the described embodiments will occur to those skilled in the art and it is intended to include such alterations within the scope of the appended claims.

What is claimed is:

1. A wiper for wiping liquid from a surface, the wiper comprising:

a first blade and a second blade disposed substantially parallel to the first blade, the first and second blades defining a channel therebetween, at least the first blade having therein one or more formations disposed along at least a portion of the length thereof, which formations are configured: (a) to permit the passage of liquid through the first blade when the first blade moves across such surface in a first direction, and (b) to inhibit passage of liquid through the first blade when the first blade moves across such surface in a second direction opposite to the first direction, the wiper being dimensioned and configured to be mountable on a reciprocating support head to bear against a windshield and to reciprocatingly move relative thereto so as to generate an arc-shaped cleared area on the windshield, whereby water which enters the channel will be expelled from at least one end of the channel, wherein the first blade is flexible and the one or more formations therein are opened to permit the passage of water therethrough by flexing of the first blade during its movement in the first direction and are closed to inhibit the passage of water therethrough by flexing of the first blade during its movement in the second direction, the first blade having a first exterior side and a second, opposite interior side, the first and second opposite sides being joined by a wiping face, the first side and the wiping face intersecting to define a first edge, and the second side and the wiping face intersecting to define a second edge, the one or more formations comprising a low friction material disposed on the first exterior side of the blade at the first edge thereof, whereby the coefficient of friction of the first side of the blade is lower than that of the second side of the blade.

2. The wiper of claim 1 wherein the second blade has therein one or more formations disposed along at least a portion of the length thereof, which formations are configured (a) to permit the passage of liquid into the channel through the second blade when the second blade moves across such surface in the second direction and (b) to inhibit the passage of liquid through the second blade when the second blade moves across the surface in the first direction.

3. The wiper of claim 2 wherein the second blade is flexible and the one or more formations therein are dimensioned and configured to be opened to permit the passage of water therethrough by flexing of the second blade during its movement in the second direction and closed to inhibit the passage of water therethrough by flexing of the second blade during its movement in the first direction.

4. The wiper of claim 2 or claim 3 further comprising at least one intermediate blade disposed between the first and second blades.

5. The wiper of claim 4 comprising one intermediate blade which divides the channel longitudinally into first and second courses.

6. The wiper of claim 5 wherein the intermediate blade is dimensioned and configured to inhibit the passage of liquid therethrough, whereby liquid which passes through the first blade is constrained to flow along the first course and liquid which passes through the second blade is constrained to flow along the second course.

7. The wiper of claim 1 wherein the low friction material comprises polytetrafluoroethylene.

8. A wiper for wiping liquid from a surface, the wiper comprising:

a first blade and a second blade disposed substantially parallel to the first blade, the first and second blades defining a channel therebetween, at least the first blade having therein one or more formations disposed along at least a portion of the length thereof, the formations comprising slits extending through the first blade and converging towards each other to provide a plurality of wedge-shaped flap members, which formations are configured: (a) to permit the passage of liquid through the first blade when the first blade moves across such surface in a first direction, and (b) to inhibit passage of liquid through the first blade when the first blade moves across such surface in a second direction opposite to the first direction, the wiper being dimensioned and configured to be mountable on a reciprocating support head to bear against a windshield and to reciprocatingly move relative thereto so as to generate an arc-shaped cleared area on the windshield, whereby water which enters the channel will be expelled from at least one end of the channel.

9. A wiper for wiping liquid from a surface, the wiper comprising:

a first blade and a second blade disposed substantially parallel to each other to define a channel therebetween, each blade being flexible and having therein a plurality of formations disposed along at least a portion of the length thereof, which formations comprise slits extending through the first and second blades to define flap members, the slits converging towards each other as sensed moving from the channel towards the exterior of the wiper, to define wedge-shaped flap members, the formations being configured: (a) to permit the passage of liquid through the first blade and inhibit passage of liquid through the second blade when the wiper moves across such surface in a first direction, by the formations in the first blade being opened and those in the second blade being closed by flexing of the blades during such movement in the first direction, and (b) to inhibit passage of liquid through the first blade and inhibit passage of liquid through the second blade when the wiper moves across such surface in a second direction opposite to the first direction by the formations in the second blade being closed and those in the first blade being opened by flexing of the blades during such movement in the second direction, the wiper being dimensioned and configured to be mountable on a reciprocating support head to bear against a windshield and to reciprocatingly move relative thereto so as to generate an arc-shaped cleared area on the windshield, whereby water which enters the channel will be expelled from at least one end of the channel.

10. The wiper of claim 9 further comprising at least one intermediate blade disposed between the first and second blades.

11. The wiper of claim 10 comprising one intermediate blade which divides the channel longitudinally into first and second courses and is dimensioned and configured to prevent the passage of liquid therethrough, whereby liquid which passes through the first blade is constrained to flow along the first course and liquid which passes through the second blade is constrained to flow along the second course.

12. The wiper of claim 9, 10 or 11 wherein the first and second blades each have first and second opposite sides joined by a wiping face, the first sides and the wiping faces intersecting to define respective exterior edges, and the second sides and the wiping faces intersecting to define respective interior edges.

* * * * *